Nov. 10, 1970 V. J. SHAH 3,540,018

READ-ONLY MAGNETIC DATA STORE

Filed Dec. 18, 1967

United States Patent Office 3,540,018

Patented Nov. 10, 1970

3,540,018
READ-ONLY MAGNETIC DATA STORE

Vinodchandra Jatashanker Shah, London, England, assignor to English Electric Computers Limited, London, England, a British company Filed Dec. 18, 1967, Ser. No. 691,660
Int. Cl. G11c 5/02, 11/04, 17/00
U.S. Cl. 340—174 1 Claim

ABSTRACT OF THE DISCLOSURE

A ready-only memory comprises a rectangular array of ferrite rods, each row of rods having a plurality of drive lines coupled to selected ones of the rods in the row. A separate sense line is coupled to each column of rods. Energisation of a drive line therefore causes an associated stored word to appear on the sense lines. Each line is coupled to adjacent rods in the column in opposite senses, thereby minimising the effects of coupling from one rod to adjacent rods. Each sense line also comprises two sensing windings on each rod, one at each end of the rod, thereby minimising the effect of the position of the drive winding on the amplitude of the output signal.

This invention relates to read-only magnetic data stores, and in particular to such stores in which drive lines are selectively coupled to ferrite rods which are in turn coupled to sense windings.

A typical store of this type comprises an array of ferrite rods arranged in rows and columns, the rods extending perpendicularly to the rows and columns. Each row of rods has one or more drive lines associated with it, each drive line being coupled to selected rods in the row. Each column of rods has a sense line associated with it, coupled to all rods in the column. The drive lines may be printed on flat boards having a regular pattern of holes through which the rods pass. Normally, the drive lines on the boards are initially printed with two branches at each hole, one branch embracing the hole and the other not, and one or other of the two branches at each hole being broken to form the desired coupling of the drive lines to the selected rods.

The store is operated by energising any selected one of the drive lines. This causes substantial flux changes in those rods to which the selected drive line is coupled, and induces signal pulses of relatively large amplitude in the associated sense lines. The remaining sense lines have only small noise pulses induced in them.

In stores of this type, it is usually found that the signal to noise ratio is relatively poor. When a rod is being driven those rods adjacent to it form return paths for the changing flux, and thus noise pulses are induced in the sense lines coupled to rods adjacent to the one being driven. It is also found that the amplitude of a signal pulse is dependent on the positions along the rod at which the drive line and sense line are coupled to the rod, the amplitude peaking sharply when the two lines are coupled to closely adjacent positions on the rod.

The object of the present invention is to improve the signal to noise ratio of such stores.

Thus according to one aspect, the invention provides a read-only magnetic data store comprising an array of ferrite rods arranged in rows and columns, a plurality of planes of drive lines, the rods extending through the planes and projecting at each end, and each drive line in a plane being associated with a respective row and being coupled to a selected combination of rods in that row, and a sense line for each column coupled to all rods in the column, the sense line comprising two similar sense windings arranged one on each side of the planes of drive lines and coupled in aiding relationship.

Thus according to the invention there is provided a read-only magnetic data store comprising an array of ferrite rods arranged in rows and columns with the rows substantially perpendicular to the columns and the row and column spacings substantially equal, at least one drive line for each row (except the outer two rows) coupled to a selected combination of rods (excluding the end two rods in the row), and a sense line for each column (except the outer two columns) magnetically coupled to adjacent rods throughout the column in opposite senses.

A read-only store in accordance with both these aspects will now be described by way of example with reference to an accompanying drawing in which.

Figure 1:
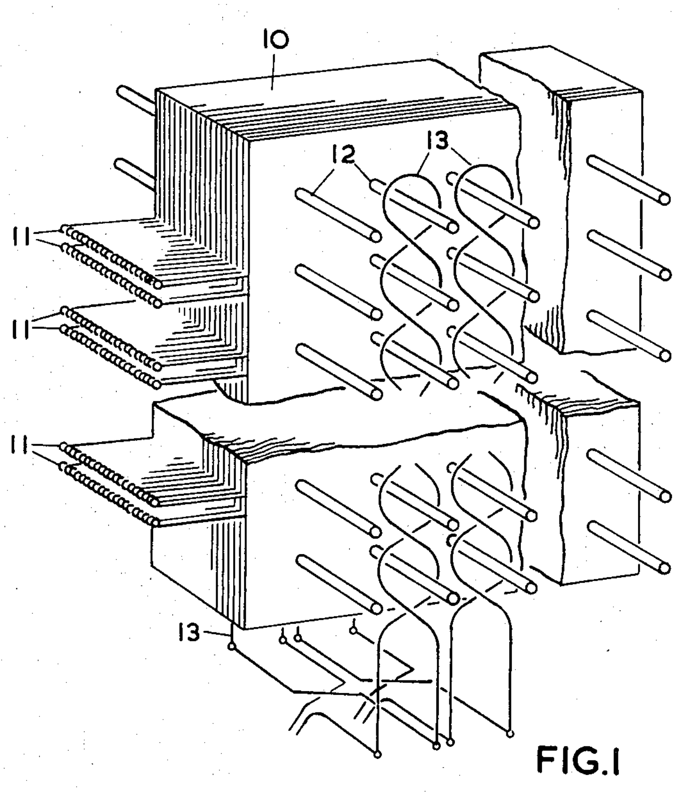
FIG. 1 shows pictorially part of the read-only store.
Figure 3:
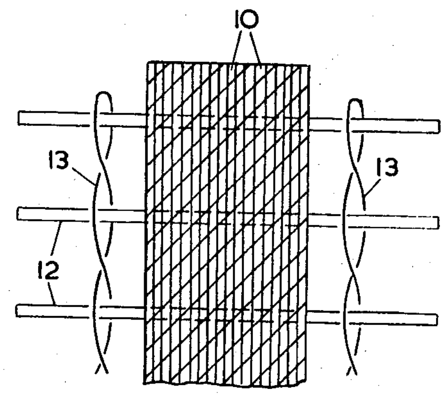
FIG. 3 shows a sectional view taken on the section XX of FIG. 2.

Referring now to the drawing, FIG. 1 shows part of a store comprising a plurality of printed circuit boards 10 each having a plurality of drive lines printed thereon connected to a plurality of drive line terminals 11. The boards 10 are assembled in close proximity as shown. Each board has drilled therein a plurality of holes uniformly distributed across its surface so that the distances separating the holes in the horizontal planes and in the vertical planes are all equal. A plurality of ferrite rods 12 are inserted through the holes in the boards 10 and extend through the store, protruding out of each side. Two sense windings 13 are associated with each vertical column (except the outer columns) of the rods and are arranged one at each side of the store (as shown in FIG. 3), being spaced a small distance along the rods from the stack of boards. The sense windings are each arranged in a twisted fashion so as to be wound in opposite senses around adjacent rods along each column. The outer rows of rods in the boards are not associated with drive lines.

Figure 2:
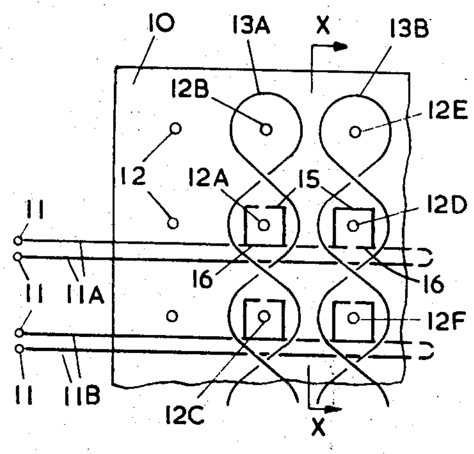
FIG. 2 shows a side view of a part of the store, showing a printed circuit board and its associated drive lines.

FIG. 2 is a partial view of the store looking in a direction parallel to the rods 12, which therefore appear as small circles in this figure. A single printed circuit board is seen in FIG. 2, together with two printed drive lines 11A and 11B. Each drive line consists of an outward-going portion and a return portion adjacent to the outwardgoing portion, the two portions being joined at the righthand edge of the board 10 (not shown in FIG. 2). At each rod in a row, the outward-going portion of the associated drive line divides into two parallel branches 15 and 16, and one or other of these branches is broken (e.g. by drilling etching, etc.) in the manufacture of the store, so as to store "0" or "1." Thus branch 15 is broken at rod 12A, so that drive line 11A is not coupled to this rod and a "0" is stored there. Portion 16 is broken at rod 12D, so that drive line 11A is coupled to this rod and a "1" is stored there. Similarly, "0's" are stored by the conjunctions of the rods 12C and 12F with the drive line 11B.

The sense lines each consist of two separate windings, which may be connected in series as shown in FIG. 1 or may have their outputs suitably mixed in aiding relationship in sense amplifiers. As shown in FIG. 3, the rods 12 protrude a substantial distance out of the sides of the stack of boards 10, and the windings 13 are placed part way along the protruding ends of the rods 12. The voltage induced in either one of the winds 13 in response to the driving of a rod 12 by a drive line on one of the boards 10 is dependent on the distance between the relevant board 10 and the winding 13, decreasing with increasing distance. By utilising two windings 13 as shown and connected in aiding relationship, the total induced voltage can be arranged to be substantially independent of the position of the relevant board 10 in the stack of boards, since a voltage above the average induced in one of the windings 13 will be compensated by a voltage below the average induced in the other windings 13. Similarly, the range of variation of noise pulses will be substantially reduced. Thus the signal to noise ratio (i.e. ratio of minimum signal to maximum noise) of the store is appreciably greater than that of a similar store using but a single sense winding for each sense line.

As seen in FIG. 2, each sense winding 13 is coupled to successive rods 12 in its associated column in opposite senses. Consider the effect of driving say, rod 12A. The flux changes occur around a closed path, and the return path for the flux is largely constituted by the eight rods 12 closest to rod 12A in the array. Since the winding 13A is coupled to rods 12B and 12C in the opposite sense to rod 12A the return flux passing through these rods will aid the signal induced in winding 13A by the flux changes in rod 12A, thus increasing the signal pulse amplitude. Much more important than this, however, is the effect on the adjacent winding 13B. The intensities of the return fluxes in rods 12D, 12C and 12F are substantially inversely proportional to the squares of their distances from rod 12A. Thus the flux changes in rods 12E and 12F will each be approximately half that in rod 12D. Since, however, the winding 13B is coupled to rod 12D in one sense and to rods 12E and 12F in the opposite sense, the voltage induced in winding 13B by rod 12D will substantially cancel the voltages induced by rods 12C and 12F. Thus a substantial reduction of noise pulses is achieved by the twisted form of the sense windings 13.

The two outermost rows and columns of rods 12 are provided to maintain the array substantially symmetrical for rods such as rod 12A, which would otherwise not be surrounded by eight other rods. The spacing between rows is substantially the same as that between columns because this has been found to give the best signal to noise ratio.

I claim:

1. A read-only magnetic data storage device including a plurality of ferrite rods arranged parallel to one another in rows and columns, a plurality of circuit boards arranged in a stack, each circuit board carrying a plurality of drive lines thereon and each of said ferrite rods being inserted in apertures in said stack and each rod protruding from both faces of said stack, means to selectively couple each drive line to individual rods in a row of said rods, a sensing circuit including a first sense winding positioned adjacent one face of said stack and coupled to a column of rods protruding from that face of said stack, a second sense winding positioned adjacent the other face of said stack and coupled to said column of rods protruding from said other face of said stack, each sense winding being twisted about the rods of the associated column of rods with said first and second sense windings connected in an aiding relationship such that the magnitude of an output signal produced by said sensing circuit is substantially independent of the distances between an energised drive line and the first and second sense windings.

References Cited

UNITED STATES PATENTS

| | | | |
|---|---|---|---|
| 3,175,199 | 3/1965 | Kilburn | 340—174 |
| 3,284,781 | 11/1966 | Takahashi | 340—173 |
| 3,380,039 | 4/1968 | Pick | 340—174 |

JAMES W. MOFFITT, Primary Examiner